Figure 1:
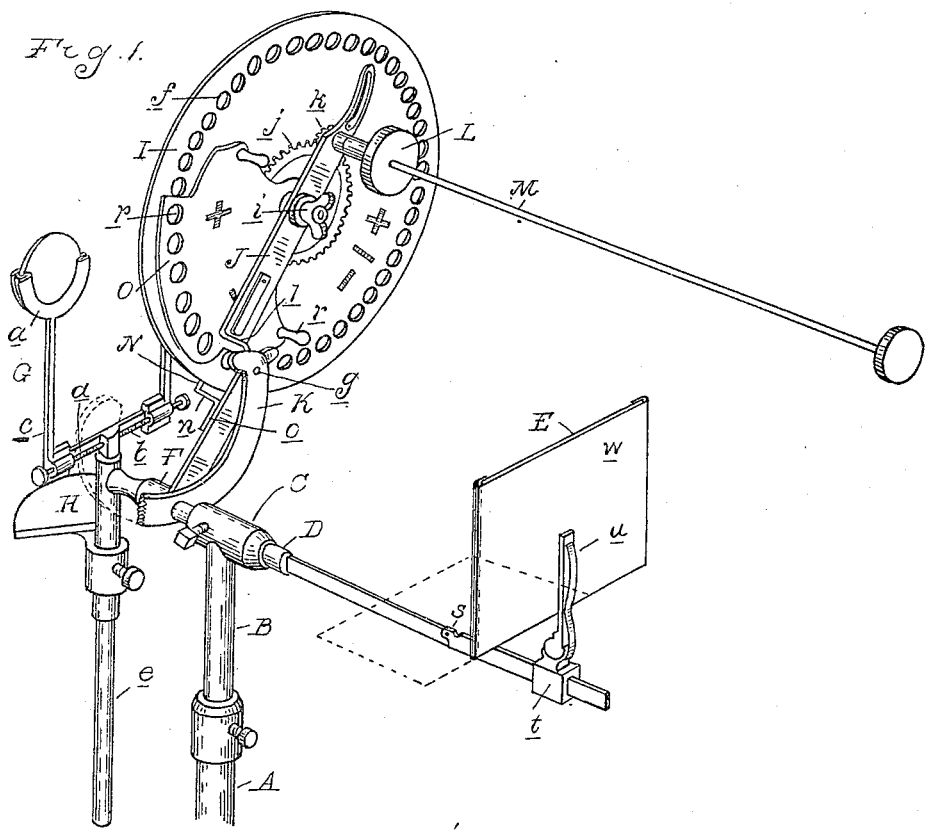

No. 690,154. Patented Dec. 31, 1901.
C. F. KANTLEHNER.
DEVICE FOR TESTING EYES.
(Application filed July 16, 1901.)
(No Model.) 2 Sheets—Sheet 1.

No. 690,154. Patented Dec. 31, 1901.
C. F. KANTLEHNER.
DEVICE FOR TESTING EYES.
(Application filed July 16, 1901.)
(No Model.) 2 Sheets—Sheet 2.
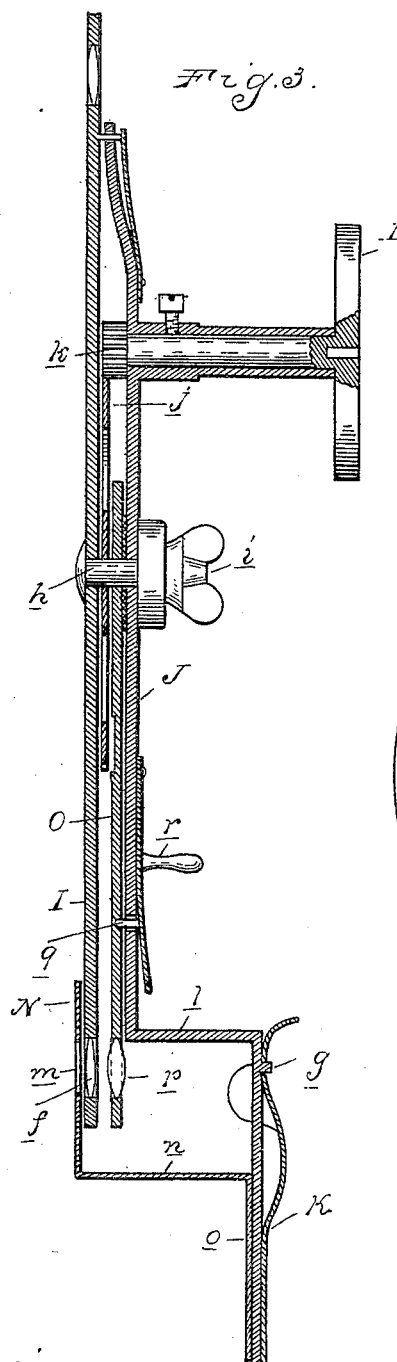
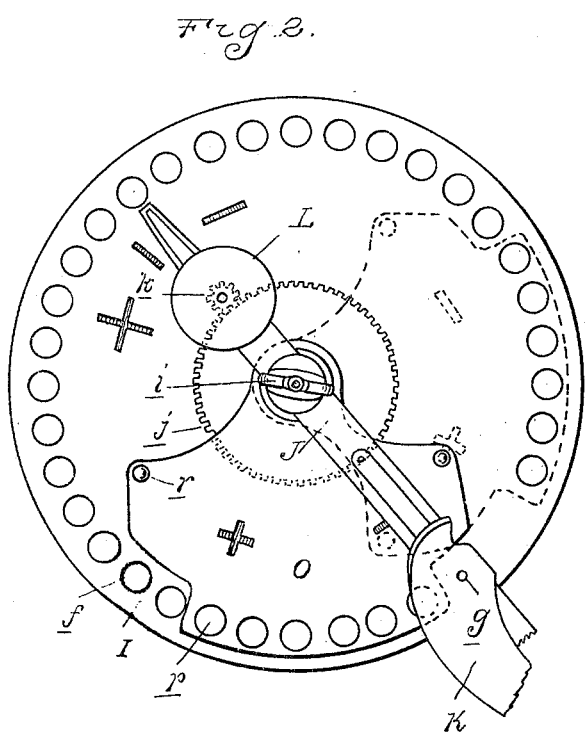
Witnesses
Inventor
Christian F. Kantlehner
By
Att'ys.

UNITED STATES PATENT OFFICE.

CHRISTIAN F. KANTLEHNER, OF CHELSEA, MICHIGAN.

DEVICE FOR TESTING EYES.

SPECIFICATION forming part of Letters Patent No. 690,154, dated December 31, 1901.

Application filed July 16, 1901. Serial No. 68,469. (No model.)

*To all whom it may concern:*

Be it known that I, CHRISTIAN F. KANTLEHNER, a citizen of the United States, residing at Chelsea, in the county of Washtenaw and State of Michigan, have invented certain new and useful Improvements in Devices for Testing Eyes, of which the following is a specification, reference being had therein to the accompanying drawings.

The invention relates generally to optometers or devices for testing eyes; and it is the special object of the invention to obtain a construction in which the tests may be more readily performed and the instrument when not in use may be compactly arranged. Heretofore instruments of this character have been made comprising a standard, a trial-frame detachably mounted thereon, and a revoluble lens-holder having a circular series of lenses of varying strength, said holder being adapted to be moved into operative relation to either sight-orifice of said trial-frame, whereby either eye may be tested. With such prior constructions a finely-graded series of lenses is usually employed, so as to secure the requisite delicacy of test, and where a greater range is needed additional lenses are placed in the trial-frame.

It is one of the objects of the present invention to dispense with the necessity of placing these additional lenses in said trial-frame by providing the instrument with an auxiliary lens-holder provided with a series of stronger lenses, which when needed may be registered with the finely-graded lenses of the main holder. In making certain tests it is necessary for the operator to stand at some distance away from the instrument. In order that the lens-holder may be adjusted by the operator while in this position, I have provided an operating means having its actuating-handle projecting forwardly from the instrument, where it will be within easy reach of the operator.

Another feature of the present invention is the peculiar construction and arrangement of a diaphragm which is movable with the support for the rotary lens-holder and which serves to limit the size of the sight-orifice. The object of this device is to permit of using lenses of lesser diameter in the rotary lens-holder, and thereby increasing the number that may be placed in circumferential series.

The invention consists in the improvements as above indicated and, further, in the peculiar construction and arrangement of parts, as hereinafter described and claimed.

Figure 4:
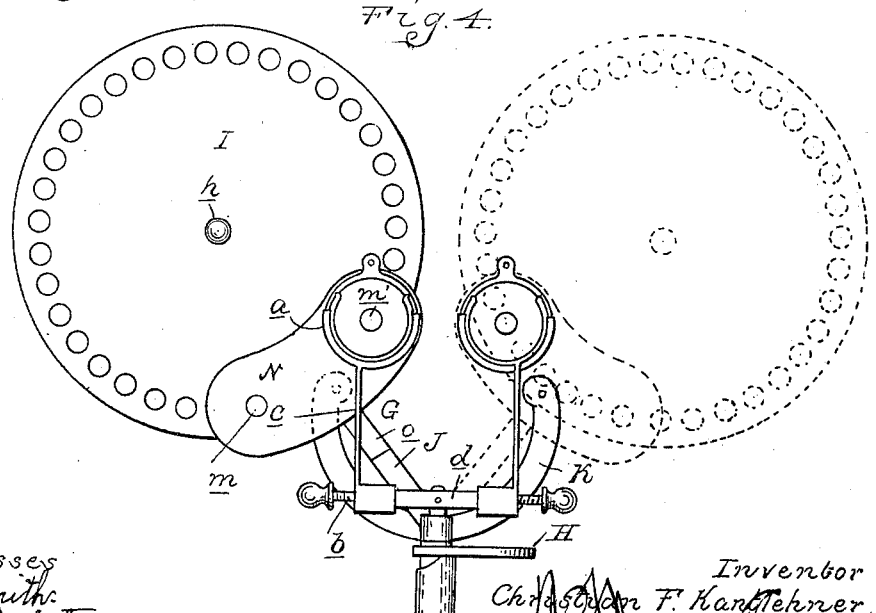

In the drawings, Figure 1 is a perspective view of the instrument. Fig. 2 is an elevation thereof. Fig. 3 is a longitudinal section through the rotary lens-holder and its carrying-arm. Fig. 4 is an elevation of the reverse side from that shown in Fig. 2.

A is a suitable standard, which is preferably provided with a telescopic extension B, by means of which the height of the instrument may be adjusted. At the upper end of the extension B is arranged a cross-head C, having sockets at its opposite ends respectively adapted to engage the shank D for supporting the test-card E and the shank F for supporting the rotary lens-holder and trial-frame. The trial-frame G may be of any suitable construction and forms no part of the present invention. It is preferably provided, however, with means for adjusting the lens-holders $a$ toward or from each other, the means shown consisting of an adjusting-screw $b$, engaging with laterally-adjustable standards $c$ upon the cross-head $d$. The cross-head $d$ in turn is provided with downwardly-extending shank $e$, engaging with a vertical socket in the shank F.

H is a chin-rest, which is preferably vertically adjustably secured upon the socket member in which the shank $e$ is placed.

I is a rotary lens-holder, which is in the form of a disk or plate journaled in the carrying-arm J and provided with a circumferential series of graded lenses $f$. The carrying-arm J is pivotally secured at its lower end upon the shank F and is adapted to be adjusted to shift said lens-holder into two positions upon opposite sides of the standard. In one of said positions the lenses of the circumferential series $f$ are adapted to be successively registered with one of the lens-holders of the trial-frame, and in the other position said graded lenses $f$ are adapted to be correspondingly registered with the other lens-holder of the trial-frame. To hold the arm J in either of these two positions of adjustment, a spring-segment K is secured to the shank F, said segment having apertures at its opposite ends adapted to engage with a locking-pin $g$. The rotary lens-holder is journaled upon the arm J in any suitable manner; but, as shown, a headed pivot-pin *h* is provided with a threaded shank, with which the winged nut *i* engages, which may be adjusted to vary the friction of the disk in turning. Secured to the disk I is a circular rack *j*, arranged concentric with the pivot. *k* is a pinion meshing with this rack and secured to the rotary head L, journaled in the arm J. This head may be employed as a hand-wheel for rotating the pinion *k*, and thereby imparting a rotary movement to the lens-holder. It is also provided with an axial socket, with which the shank of the extension-handle M is adapted to engage, the latter extending outward. The handle is for the purpose hereinbefore mentioned—viz., to enable the operator to adjust the instrument when standing at some distance from the lens-holder. The carrying-arm J for the rotary lens-holder is preferably provided with an offset *l*, which provides clearance for the nose of the patient in the adjusement of the arm from one side to the other of the standard.

N is a diaphragm, preferably formed of sheet metal and arranged adjacent to the opposite side of the disk I from the circular rack *j*. This diaphragm is provided with two apertures *m* and *m'*, which in the different positions of adjustment of the arm J are adapted, respectively, to register with the lens-holders of the trial-frame. Thus when the arm J is in the position shown in full lines in Fig. 2 the aperture is centrally registered with the left-hand lens-holder of the trial-frame, while in the position shown in dotted lines the aperture *m'* is registered with the right-hand lens-holder. In both positions the diaphragm acts as a light-stop, which shuts off all light from the eye of the patient excepting that passing through the test-lens *f* which is in registration with the aperture in the diaphragm. The diaphragm N is secured to the arm J by a laterally-extending central securing portion *n*, having a flange *o* riveted or otherwise secured to said arm.

O is an auxiliary lens-holder. This is in the form of a segmental plate, which is pivoted upon the same pin *h*, forming a journal for the lens-holder I. This plate carries a segmental series of lenses *p*, which are of considerably greater power than those carried by the holder I. In order to test the eyes for either near or far sightedness, the lenses in both holders are divided into two series on opposite sides of a neutral line, which are designated, respectively, by the signs "—" and "+." Thus, as shown in Fig. 1, the auxiliary holder O is provided with three lenses in the "+" series and a corresponding number in the "—" series. The number of lenses is, however, immaterial and may be varied as desired. For holding the auxiliary holder in proper registration with the main holder I a suitable latch-pin is provided, such as *q*, which engages with a corresponding notch in the plate O. Said plate O is also preferably provided with handles *r*, by means of which it may be properly adjusted.

The shank D for supporting the test-card is preferably jointed, as shown, with a rule-joint *s*, which permits of its being folded when not in use. The test-card E is adjustably secured upon the shank D by a sliding sleeve *t*, which has an arm *u* hinged thereto, which is attached to the card-holder *w*.

In the use of the instrument the patient is seated so as to bring his eyes in adjacence to the trial-frame, and if necessary the extension B of the standard may be adjusted in position to bring said trial-frame in registration with the eyes. The operator then swings the arm J so as to bring the holder I in proper relation to the eye first to be tested. In making the test the graded lenses *f* of the holder I are first brought successively into registration with the trial-frame, and if more powerful lenses are required the holder O may then be adjusted to bring one of the lenses *p* in conjunction with the lenses *f*. The rotation of the holder I may be effected either by directly turning the handle L, or where needed the extension-handle M may be used.

As the invention in the present case relates particularly to certain features of construction which have already been fully set forth, a further description of the operation is deemed to be unnecessary.

What I claim as my invention is—

1. In a device for testing eyes, the combination with a standard, of a trial-frame mounted thereon, a rotary lens-holder also mounted in said standard and having a circumferential series of graded lenses adapted to be successively registered with the sight-orifice of said trial-frame, and an apertured diaphragm arranged between said rotary holder and trial-frame forming a stop for shielding the eye from all light save that passing through the registered lens.

2. In a device for testing eyes, the combination with a standard and a lens-holding trial-frame mounted thereon having sight-orifices for both eyes, of a rotary lens-holder having a circumferential series of graded lenses, a swinging arm mounted on said standard and carrying said rotary lens-holder, whereby the latter may be adjusted from a position to register its lenses in rotation with the sight-orifice for one eye into a corresponding position in relation to the other eye, and an apertured diaphragm carried by said arm and arranged between said rotary lens-holder and trial-frame, said diaphragm forming a stop for shielding the eye from all light save that passing through the registered lens.

In testimony whereof I affix my signature in presence of two witnesses.

CHRISTIAN F. KANTLEHNER.

Witnesses:
  M. B. O'DOGHERTY,
  H. C. SMITH.